US012704871B2

(12) United States Patent
Moreira et al.

(10) Patent No.: US 12,704,871 B2
(45) Date of Patent: Aug. 11, 2026

(54) I/O HARDWARE POWER MANAGEMENT

(71) Applicant: ATI Technologies ULC, Markham (CA)

(72) Inventors: Carlos Javier Moreira, Markham (CA); Michael McLean, Markham (CA); Philip Ng, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 18/345,985

(22) Filed: Jun. 30, 2023

(65) Prior Publication Data

US 2025/0004494 A1 Jan. 2, 2025

(51) Int. Cl.
*G06F 1/04* (2006.01)

(52) U.S. Cl.
CPC .................................... *G06F 1/04* (2013.01)

(58) Field of Classification Search
CPC .......... G06F 1/04; G06F 1/3278; G06F 3/061; G06F 11/3485
See application file for complete search history.

(56) References Cited

U.S. PATENT DOCUMENTS

| | | | | |
|---|---|---|---|---|
| 7,113,478 B2 * | 9/2006 | Bauer | H04W 28/12 370/477 |
| 7,840,825 B2 * | 11/2010 | Altevogt | G06F 1/324 713/320 |
| 2007/0106836 A1 * | 5/2007 | Lee | G06F 13/385 711/E12.019 |
| 2008/0228959 A1 * | 9/2008 | Wang | G06F 1/206 710/22 |
| 2009/0144568 A1 * | 6/2009 | Fung | G06F 1/324 713/300 |
| 2010/0299545 A1 * | 11/2010 | Lyu | G06F 1/324 713/320 |
| 2013/0151869 A1 * | 6/2013 | Steinman | G06F 1/3243 713/300 |
| 2014/0344597 A1 * | 11/2014 | Thumma | G06F 1/3275 713/322 |
| 2022/0121492 A1 * | 4/2022 | Cieslak | G06F 11/3433 |

* cited by examiner

*Primary Examiner* — Hyun Soo Kim
(74) *Attorney, Agent, or Firm* — Greenberg Traurig, LLP

(57) ABSTRACT

The disclosed device includes an input/output (I/O) system clock configured to operate at one of a plurality of clock states and a control circuit configured to dynamically adjust a clock state of the I/O system clock. The control circuit can update an activity level of a current clock state based at least on I/O traffic activity and, in response to the activity level going beyond an activity range for the current clock state, transition the I/O system clock to a neighboring clock state. Various other methods, systems, and computer-readable media are also disclosed.

18 Claims, 4 Drawing Sheets

I/O HARDWARE POWER MANAGEMENT

BACKGROUND

A computing system can have various sub-systems which can operate with their own system clock. For example, an input/output (I/O) sub-system can have an I/O clock for operating I/O devices (e.g., peripheral devices, storage devices, graphics devices, machine learning devices, video compression devices, and other connected devices for input and/or output). A clock frequency can be used to manage power/performance of devices (e.g., a higher frequency corresponds to higher performance with higher power consumption). A firmware-based I/O clock management can dynamically adjust the I/O clock frequency, but is often unable to respond quickly enough for efficient power management.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
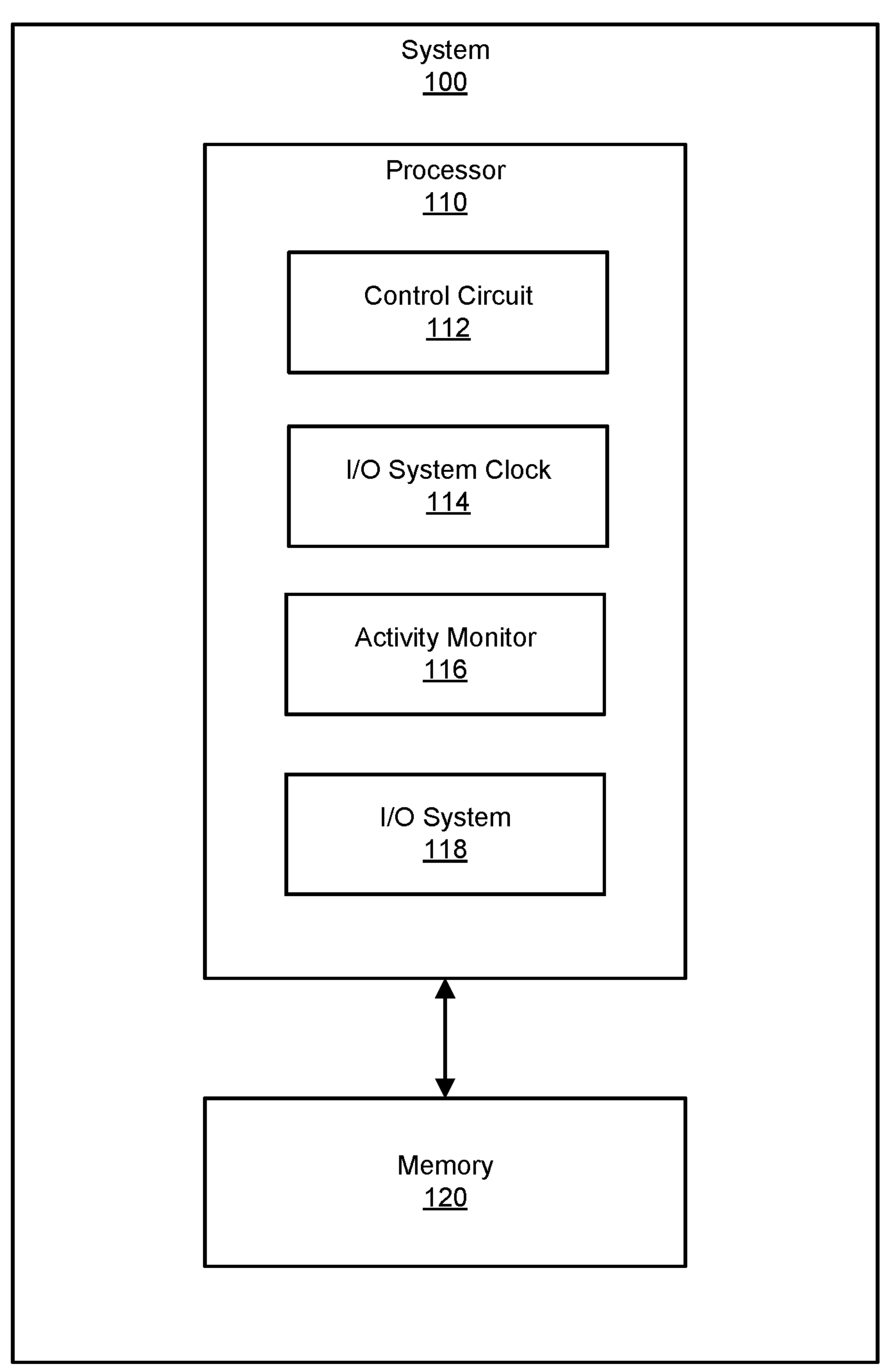
FIG. 1 is a block diagram of an exemplary system for I/O hardware power management.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to I/O hardware power management via dynamically adjusting I/O system clock states (e.g., frequencies). As will be explained in greater detail below, implementations of the present disclosure can select an appropriate clock state or frequency for an I/O system clock by monitoring an activity level (e.g., based on I/O traffic) for a current clock state, and transitioning to an appropriate clock state (e.g., a higher or lower frequency) if the activity level falls outside of a preferred range for the current clock state. By dynamically adjusting the clock state based on activity level, the systems and methods described herein can more efficiently utilize power while maintaining the required I/O performance, by using an appropriate clock state and power consumption for a current activity level, and changing to a lower power state in response to reduced activity, and a higher power state in response to increased activity.

In one implementation, a device for I/O hardware power management includes a control circuit configured to dynamically adjust a clock state of an input/output (I/O) system clock by: updating an activity level value of a first clock state based at least on I/O traffic activity, and in response to the activity level value going beyond an activity range for the first clock state, transitioning the I/O system clock to a second clock state.

In some examples, the control circuit is configured to update the activity level value by incrementing the activity level value based on the I/O traffic activity from an activity monitor, and decrementing the activity level value based on a decrement rate. In some examples, the decrement rate corresponds to a predicted rate of outgoing I/O traffic. In some examples, the decrement rate corresponds to an observed rate of outgoing I/O traffic.

In some examples, the control circuit is configured to transition the I/O system clock by transitioning, in response to the activity level value exceeding an upper threshold of the activity range, the I/O system clock to an available higher performance clock state. In some examples, the control circuit is configured to transition the I/O system clock by transitioning, in response to the activity level value falling below a lower threshold of the activity range, the I/O system clock to an available lower performance clock state.

In some examples, the control circuit is configured to transition the I/O system clock by initializing an activity level value for the transitioned clock state. In some examples, each of a plurality of clock states of the I/O system clock is associated with a programmable initial activity level value, a programmable decrement rate, and a programmable activity range comprising an upper threshold and a lower threshold.

In some examples, each of the plurality of clock states corresponds to a clock frequency and the device further comprises a frequency selection circuit configured to select a desired clock frequency. In some examples, the frequency selection circuit corresponds to a multiplexer.

In one implementation, a system for I/O hardware power management includes an input/output (I/O) system including an I/O system clock configured to operate at one of a plurality of clock states, each of the plurality of clock states corresponding to a clock frequency, a frequency selection circuit coupled to the I/O system clock and configured to select between the plurality of clock states, and an activity monitor configured to observe I/O traffic activity. The system also includes a control circuit configured to dynamically adjust a clock state of the I/O system clock by updating an activity level value of a first clock state based at least on the I/O traffic activity, and in response to the activity level value going beyond an activity range for the first clock state, transitioning the I/O system clock to a second clock state.

In some examples, the control circuit is configured to update the activity level value by incrementing the activity level value based on the I/O traffic activity from the activity monitor, and decrementing the activity level value based on a decrement rate. In some examples, the decrement rate corresponds to a predicted rate of outgoing I/O traffic. In some examples, the decrement rate corresponds to an observed rate of outgoing I/O traffic.

In some examples, the control circuit is configured to transition the I/O system clock by transitioning, in response to the activity level value exceeding an upper threshold of the activity range, the I/O system clock to an available higher performance clock state. In some examples, the control circuit is configured to transition the I/O system clock by transitioning, in response to the activity level value falling below a lower threshold of the activity range, the I/O system clock to an available lower performance clock state.

In some examples, each of the plurality of clock states is associated with a programmable initial activity level value, a programmable decrement rate, and a programmable activity range comprising an upper threshold and a lower threshold, and the control circuit is configured to transition the I/O system clock by initializing an activity level value for the transitioned clock state based on the programmable initial activity level value. In some examples, the frequency selection circuit corresponds to a multiplexer.

In one implementation, a method for I/O hardware power management includes incrementing an activity level value of a first clock state of an input/output (I/O) system clock based on I/O traffic activity from an activity monitor, decrementing the activity level value based on a decrement rate, and in response to the activity level value going beyond an activity range for the first clock state, transitioning the I/O system clock to a second clock state.

In some examples, transitioning the I/O system clock further includes transitioning, in response to the activity level value exceeding an upper threshold of the activity range, the I/O system clock to an available higher performance clock state, and transitioning, in response to the activity level value falling below a lower threshold of the activity range, the I/O system clock to an available lower performance clock state.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of I/O hardware power management via dynamic I/O clock adjustment. Detailed descriptions of example systems for dynamic I/O clock adjustment will be provided in connection with FIGS. 1 and 2. Detailed descriptions of an example activity level monitoring will be provided in connection with FIG. 3. Detailed descriptions of corresponding methods will also be provided in connection with FIG. 4.

FIG. 1 is a block diagram of an example system 100 for I/O hardware power management via dynamic I/O clock adjustment. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, an I/O system clock 114, and an activity monitor 116. Control circuit 112 corresponds to a dynamic power management circuit and more specifically circuitry that can coordinate and/or select a clock state (e.g., frequency) of I/O system clock 114. I/O system clock 114 corresponds to a clock circuit for providing a clock signal for I/O system 118. I/O system 118 corresponds to a system or sub-system of processor 110 for input/output devices (e.g., peripheral devices, graphics devices, machine learning devices, input devices, etc.) including various links and/or interconnects. I/O system clock 114 provides the clock signal for I/O system 118 at a particular frequency such that at higher frequencies, I/O system 118 operates/processes at a faster rate (e.g., higher performance) while consuming more power, and at lower frequencies, I/O system 118 operates/processes at a slower rate (e.g., lower performance) while consuming less power. Activity monitor 116 corresponds to a circuit that can monitor and report I/O traffic activity of I/O system 118. In some examples, activity monitor 116 can detect incoming (e.g., new requests and/or operations) I/O traffic on I/O system 118 and further in certain examples, activity monitor 116 can also detect outgoing (e.g., completed requests and/or operations) I/O traffic. In some examples, I/O system clock 114 and/or activity monitor 116 can be incorporated into I/O system 118.

Figure 2:
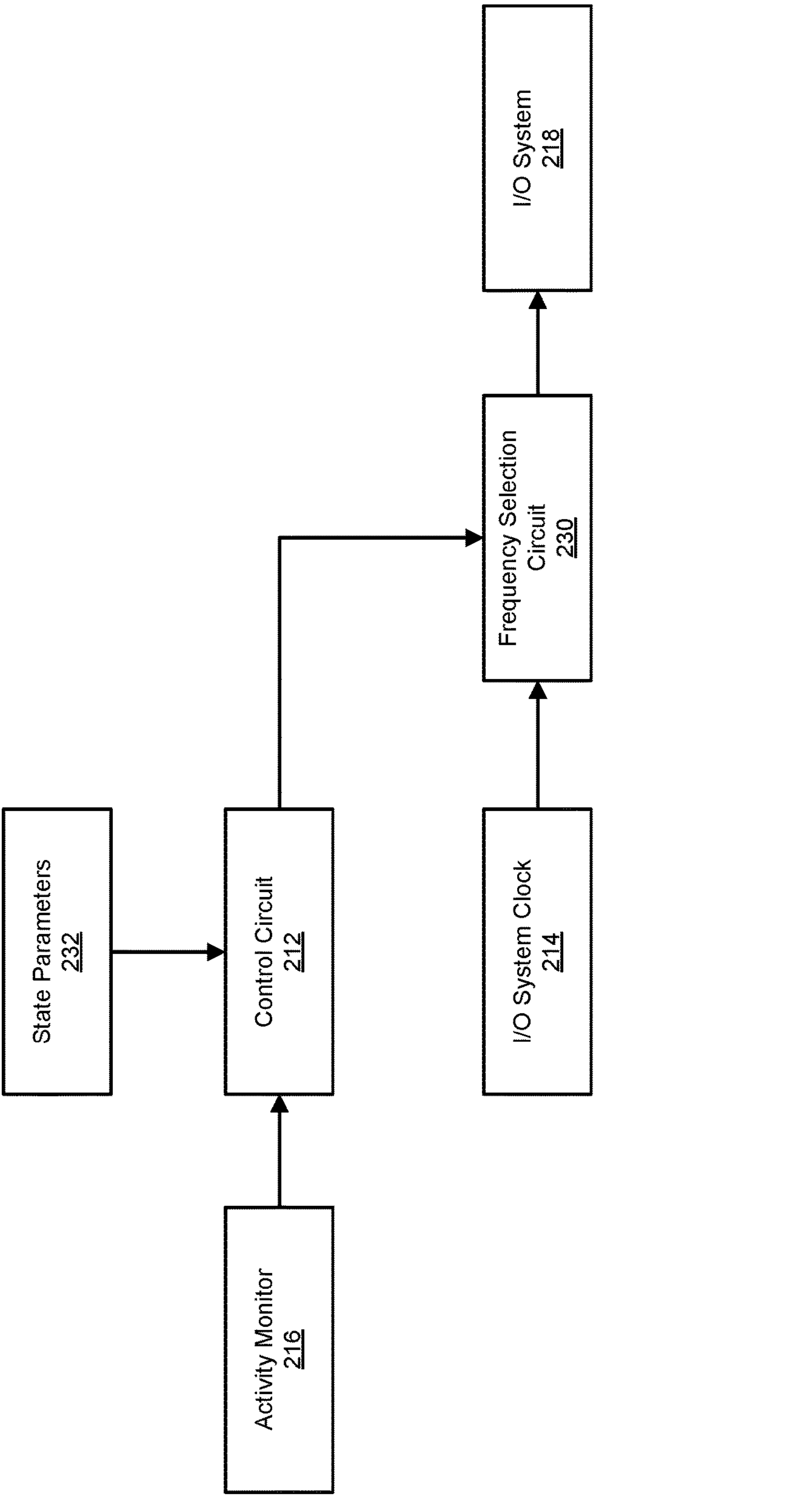
FIG. 2 is a simplified block diagram of an exemplary circuit for I/O hardware power management.

FIG. 2 illustrates a system 200 corresponding to system 100 and/or a portion thereof. FIG. 2 includes a control circuit 212 corresponding to control circuit 112, an activity monitor 216 corresponding to activity monitor 116, an I/O system clock 214 corresponding to I/O system clock 114, an I/O system 218 corresponding to I/O system 118, and a frequency selection circuit 230. Frequency selection circuit 230 corresponds to a circuit for selecting a clock frequency (e.g., clock state) of I/O system clock 214 and can include, in some examples, circuitry for producing and/or selecting between clock frequencies (e.g., a clock or frequency divider, a multiplexer, etc.) and in some examples can be partially or fully incorporated with I/O system clock 214 and/or control circuit 212.

As described herein, I/O system clock 214 can operate at various clock states, each clock state corresponding to a different frequency, with a higher clock state corresponding to higher performance (and higher frequency along with increased power consumption) and a lower clock state corresponding to lower performance (and lower frequency along with reduced power consumption). Frequency selection circuit 230 can establish a current clock state such that the corresponding clock frequency signal is propagated through I/O system 218.

Figure 3:
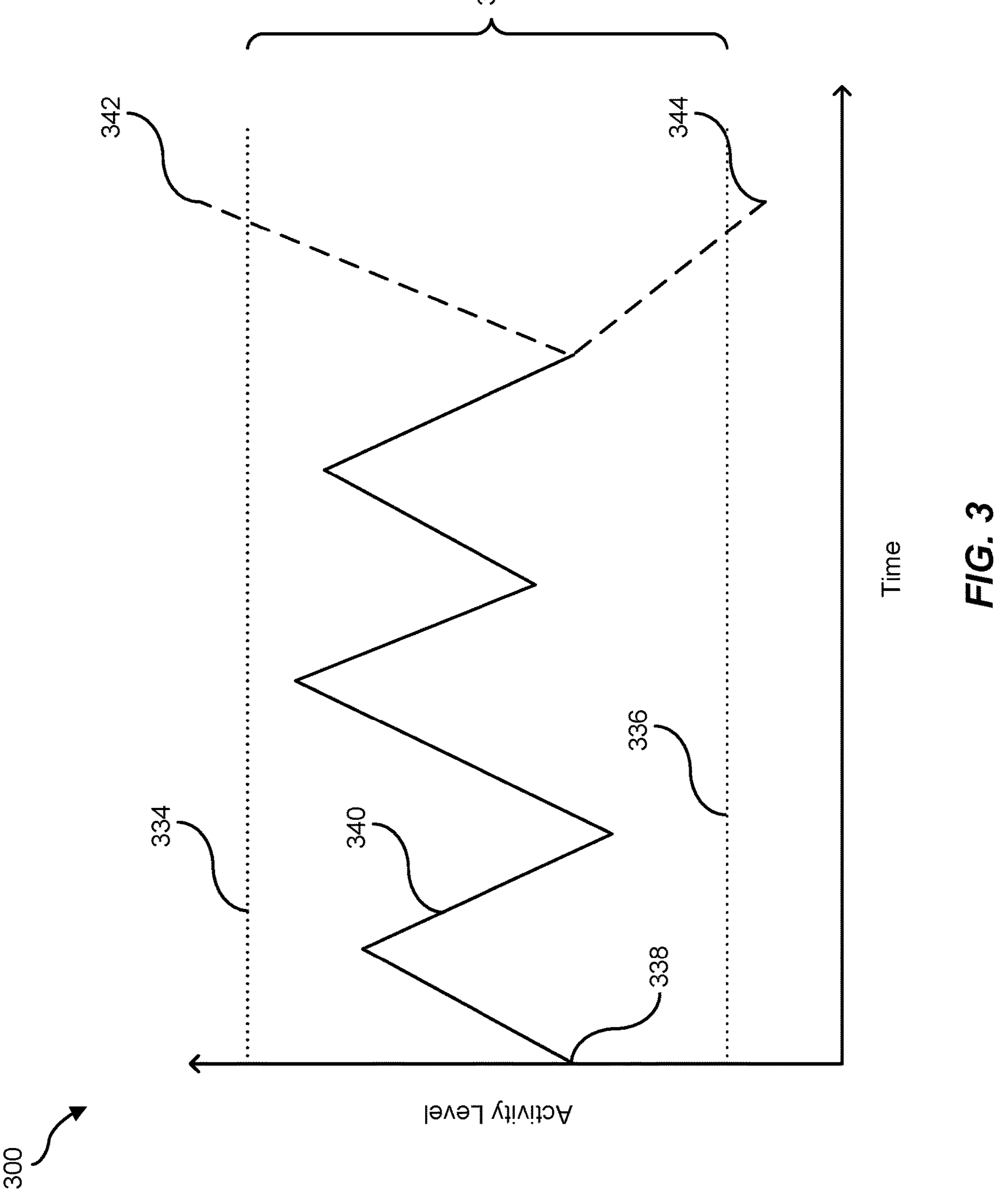
FIG. 3 is a graph of traffic activity for I/O hardware power management.

Control circuit 212 can monitor an activity level of the current clock state to determine, based on at least state parameters 232, whether to transition to a different clock state. State parameters 232 can include programmable parameters for each clock state, such as an activity range that can be defined by an upper threshold and a lower threshold, a decrement rate, and in some examples, an initial activity level. FIG. 3 illustrates a graph 300 corresponding to activity level monitoring by control circuit 212.

FIG. 3 illustrates an activity level 340 updated and monitored by control circuit 212 over time for the current clock state. Based on state parameters 232, the current clock state can be defined by an activity range 346 further defined by an upper threshold 334 and a lower threshold 336. In some examples, when transitioning into the current state, control circuit 212 can begin monitoring activity level 340 starting with an initial activity level 338. Initial activity level 338 can be predetermined based on a heuristic, for example a midpoint of activity range 346, or another appropriate level for efficiently using the current clock state.

Activity level 340 (e.g., an activity level value) corresponds to a quantized representation of current I/O traffic (e.g., requests, operations, data flow, etc.) for the current clock state, further representing bandwidth utilization on I/O system 218, and can be measured or otherwise represented by an appropriate metric (e.g., based on bits of data per clock cycle, operations, etc.) and accordingly updated/stored as a data value. Control circuit 212 can accordingly update activity level 340 based on observed and/or estimated I/O traffic. For example, control circuit 212 can receive from activity monitor 216, updated I/O traffic activity as observed by activity monitor 216. In some examples, activity monitor 216 can observe incoming I/O traffic on I/O system 218 and control circuit 212 can accordingly increment (e.g., based on an appropriate quantization) activity level 340.

Control circuit 212 can also decrement activity level 340. In some examples, activity monitor 216 can observe or otherwise provide information on outgoing I/O traffic on I/O system 218. However, in other examples, it can be infeasible to accurately measure outgoing I/O traffic, for example because of the various devices connected through I/O system 218. In such examples, state parameters 232 can include a decrement rate corresponding to a predicted rate of outgoing I/O traffic (e.g., bandwidth availability over time). In some examples, the decrement rate can be established via heuristics, such as observed bandwidth availability over time for a given clock state.

As illustrated in FIG. 3, control circuit 212 can update activity level 340 by incrementing and decrementing activity level 340 over time. When activity level 340 remains within activity range 346 (e.g., staying below upper threshold 334 and above lower threshold 336), control circuit 212 can maintain the current clock state. Thus, with low to moderate I/O traffic activity, power savings can be realized by maintaining the current clock state. When activity level 340 goes beyond activity range 346 (e.g., exceeding upper threshold 334 or falling below lower threshold 336), control circuit 212 can transition (e.g., via frequency selection circuit 230) I/O system clock 214 to a neighboring clock state if available.

In one example, an activity level 342 exceeds upper threshold 334 (e.g., corresponding to an inrush of I/O traffic), indicating that the current clock state is insufficient for the current I/O traffic. In response, control circuit 212 can transition I/O system clock 214 to a higher performance clock state, if available, by instructing frequency selection circuit 230 to select the appropriate frequency. In some examples, a higher performance clock state can be unavailable, such as if the current clock state is already the highest available clock state, if a current power supply restricts higher clock states, etc. In some examples, control circuit 212 can select a higher clock state that is more than one level higher (e.g., skipping one or more states). Thus, control circuit 212 can quickly transition to higher clock states for improved responsiveness to an inrush of traffic.

In another example, an activity level 344 falls below lower threshold 336, indicating that the current clock state is providing more performance (and using more power) than needed for the current I/O traffic. In response, control circuit 212 can transition I/O system clock 214 to a lower performance clock state, if available, by instructing frequency selection circuit 230 to select the appropriate frequency. In some examples, a lower performance clock state can be unavailable, such as if the current clock state is already the lowest available clock state, etc. In some examples, control circuit 212 can select a lower clock state that is more than one level lower (e.g., skipping one or more states). Thus, control circuit 212 can more efficiently manage power consumption.

Figure 4:
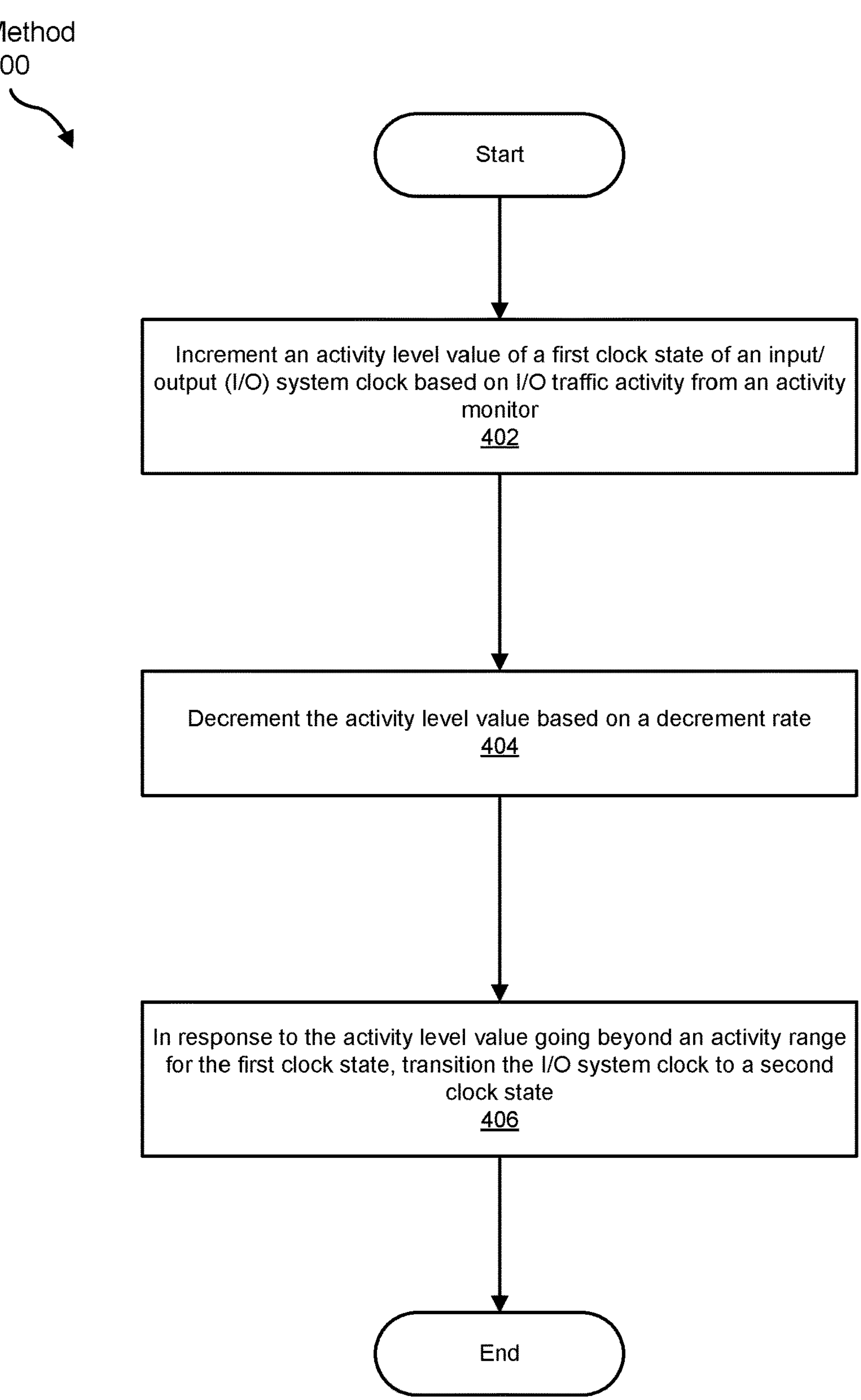
FIG. 4 is a flow diagram of an exemplary method for I/O hardware power management.

FIG. 4 is a flow diagram of an exemplary method 400 for I/O hardware power management via dynamic I/O clock adjustment. The steps shown in FIG. 4 can be performed by any suitable circuit, computer-executable code and/or computing system, including the system(s) illustrated in FIGS. 1 and/or 2. In one example, each of the steps shown in FIG. 4 represent an algorithm whose structure includes and/or is represented by multiple sub-steps, examples of which will be provided in greater detail below.

As illustrated in FIG. 4, at step 402 one or more of the systems described herein increment an activity level value of a first clock state of an input/output (I/O) system clock based on I/O traffic activity from an activity monitor. For example, control circuit 112 can increment an activity level value (e.g., activity level 340) corresponding to a current clock state of I/O system clock 114 based on I/O traffic activity from activity monitor 116. In some examples, the activity level value corresponds to a quantized representation of current I/O traffic that can be stored as a data value (e.g., in a register, a memory, etc.) and incremented and/or decremented by control circuit 112 as described herein.

At step 404 one or more of the systems described herein decrement the activity level value based on a decrement rate. For example, control circuit 112 can decrement the activity level value based on a decrement rate as described herein.

At step 406 one or more of the systems described herein transition, in response to the activity level value going beyond an activity range for the first clock state, the I/O system clock to a second clock state. For example, control circuit 112 can transition I/O system clock 114 to a neighboring clock state (e.g., a clock state one level higher or one level lower than the current clock state or in some examples a clock state that is within an available range of levels with respect to the current clock state) in response to the activity level going beyond an activity range for the current clock state.

The systems described herein can perform step 406 in a variety of ways. In one example, control circuit 112 can transition, in response to the activity level value exceeding an upper threshold of the activity range, I/O system clock 114 to an available higher performance clock state. In one example, control circuit 112 can transition, in response to the activity level value falling below a lower threshold of the activity range, I/O system clock 114 to an available lower performance clock state.

In various computing architectures, dynamically changing an I/O subsystem clock to effectively save power can be challenging. A firmware-based dynamic clock switching algorithm can reduce the clock frequency when the firmware detected no I/O activity for a long period of time, and subsequently increase the clock frequency when the firmware detected I/O activity again. However, this approach is unable to increase the frequency fast enough in response to an inrush of I/O traffic, and causing device compatibility issues. In addition, the firmware-based may not efficiently utilize the slow frequencies.

The systems and methods described herein advantageously enable a hardware-based dynamic I/O subsystem clock management to enable power savings during both idle periods and periods of low/moderate I/O bandwidth. This fully hardware-based solution can implement a leaky bucket algorithm to dynamically manage the I/O sub-system clock based on I/O bandwidth.

In some cases, a higher clock frequency state to lower clock frequency state transition does not require a large period of idle for the transition to occur. In addition, both no traffic and moderate traffic conditions can trigger a lower clock frequency transition for power savings. For the lower clock frequency state to the higher clock frequency state transition, the rate of traffic may need to exceed a programmed leaky bucket drip/threshold to trigger the transition.

In some examples, a moderate rate of traffic does not trigger a higher clock frequency transition, providing power savings, and further allows utilizing low clock frequency states for more than just idle periods. An inrush of high bandwidth traffic (to/from I/O devices) can cause immediate transition to the higher clock frequency state to improve responsiveness.

As detailed above, the circuits, computing devices, and systems described and/or illustrated herein broadly represent any type or form of computing device or system capable of executing computer-readable instructions. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:

a control circuit configured to dynamically adjust a clock state of an input/output (I/O) system clock by:

updating an activity level value of a first clock state of the I/O system clock based at least on I/O traffic activity, wherein the control circuit is configured to update the activity level value by:

incrementing the activity level value based on the I/O traffic activity from an activity monitor, while decrementing the activity level value based on a decrement rate over time; and in response to the activity level value going beyond an activity range for the first clock state, transitioning the I/O system clock to a second clock state.

2. The device of claim 1, wherein the decrement rate corresponds to a predicted rate of outgoing I/O traffic over time.

3. The device of claim 1, wherein the decrement rate corresponds to an observed rate of outgoing I/O traffic over time.

4. The device of claim 1, wherein the control circuit is configured to transition the I/O system clock by transitioning, in response to the activity level value exceeding an upper threshold of the activity range, the I/O system clock to an available higher performance clock state.

5. The device of claim 1, wherein the control circuit is configured to transition the I/O system clock by transitioning, in response to the activity level value falling below a lower threshold of the activity range, the I/O system clock to an available lower performance clock state.

6. The device of claim 1, wherein the control circuit is configured to transition the I/O system clock by initializing an activity level value for the transitioned clock state.

7. The device of claim 1, wherein each of a plurality of clock states, which includes the first clock state and the second clock state, is associated with a programmable initial activity level value, a programmable decrement rate, and a programmable activity range comprising an upper threshold and a lower threshold.

8. The device of claim 1, wherein each of a plurality of clock states, which includes the first clock state and the second clock state, corresponds to a clock frequency and the device further comprises a frequency selection circuit configured to select a desired clock frequency.

9. The device of claim 8, wherein the frequency selection circuit corresponds to a multiplexer.

10. A system comprising:

an input/output (I/O) system comprising:

an I/O system clock configured to operate at one of a plurality of clock states, each of the plurality of clock states corresponding to a clock frequency;

a frequency selection circuit coupled to the I/O system clock and configured to select between the plurality of clock states; and an activity monitor configured to observe I/O traffic activity; and a control circuit configured to dynamically adjust a clock state of the I/O system clock by:

updating an activity level of a first clock state based at least on the I/O traffic activity, wherein the control circuit is configured to update the activity level by:

incrementing the activity level based on the I/O traffic activity from the activity monitor, while decrementing the activity level based on a decrement rate over time; and in response to the activity level going beyond an activity range for the first clock state, transitioning the I/O system clock to a second clock state.

11. The system of claim 10, wherein the decrement rate corresponds to a predicted rate of outgoing I/O traffic over time.

12. The system of claim 10, wherein the decrement rate corresponds to an observed rate of outgoing I/O traffic over time.

13. The system of claim 10, wherein the control circuit is configured to transition the I/O system clock by transitioning, in response to the activity level exceeding an upper threshold of the activity range, the I/O system clock to an available higher performance clock state.

14. The system of claim 10, wherein the control circuit is configured to transition the I/O system clock by transitioning, in response to the activity level falling below a lower threshold of the activity range, the I/O system clock to an available lower performance clock state.

15. The system of claim 10, wherein each of the plurality of clock states is associated with a programmable initial activity level value, a programmable decrement rate, and a programmable activity range comprising an upper threshold and a lower threshold, and the control circuit is configured to transition the I/O system clock by initializing an activity level value for the transitioned clock state based on the programmable initial activity level value.

16. The system of claim 10, wherein the frequency selection circuit corresponds to a multiplexer.

17. A method comprising:

incrementing an activity level of a first clock state of an I/O system clock based on I/O traffic activity from an activity monitor while decrementing the activity level based on a decrement rate over time; and in response to the activity level going beyond an activity range for the first clock state, transitioning the I/O system clock to a second clock state.

18. The method of claim 17, wherein transitioning the I/O system clock further comprises:

transitioning, in response to the activity level exceeding an upper threshold of the activity range, the I/O system clock to an available higher performance clock state; and transitioning, in response to the activity level falling below a lower threshold of the activity range, the I/O system clock to an available lower performance clock state.

* * * * *